Nov. 8, 1932.  G. T. SCHRODER  1,886,747

FOLDING MAGNIFIER ATTACHMENT

Filed June 4, 1929

INVENTOR.
George T. Schroder
BY
Wm. T. Hedlund
his ATTORNEY.

Patented Nov. 8, 1932

1,886,747

UNITED STATES PATENT OFFICE

GEORGE T. SCHRODER, OF NEW YORK, N. Y.

FOLDING MAGNIFIER ATTACHMENT

Application filed June 4, 1929. Serial No. 368,418.

This invention relates to folding magnifying attachments for electric flash lights and the like, with particular reference to that class wherein a magnifying glass is supported in a frame which in turn is hinged to an enveloping band about the body of the flash light and so arranged that the glass may be thrown forward over reading matter to be illuminated and read, in active position of the parts, and retracted when the glass is not required, so that the glass and its frame are doubled back upon said flash light body and held in inoperative position.

The main object of my invention is to provide means which may be attached to flash lights, preferably of the small pocket variety, which enable a user to illuminate reading matter, house numbers, names in letter boxes and the like in poorly lighted locations and at the same time have such illuminated matter sufficiently magnified as to be easily legible without strain or effort.

Another object is to provide flash lights with attachments of the character indicated without rendering the same bulky or unwieldly, nor curtailing normal use in any manner.

A further object is to provide such attachments which are very reasonable in cost and readily attached to flash lights without aid of a mechanic or tools, and yet which will serve as well as if originally incorporated in the flash light structure when first made.

Still another object is to have a magnifying attachment for a flash light which normally is folded back and held in inactive and also unobtrusive position upon the flash light body, and which may be folded or thrown forward over the front end of the flash light body so as to overlie any reading matter or the like over which the flash light is laid or passed.

Further objects and the various novel and useful features of the invention will appear more fully in detail hereinafter as this specification proceeds.

In the accompanying drawing:—

The same reference numerals indicate the same or duplicate parts throughout the views.

Figure 1:
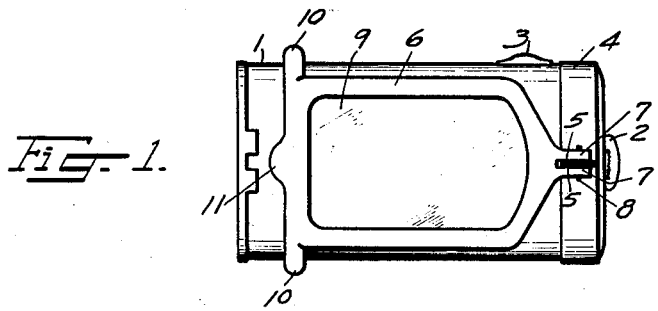
Fig. 1 is a plan view of a flash light provided with an attachment embodying my invention, and disposed in retracted inoperative position.
Figure 2:
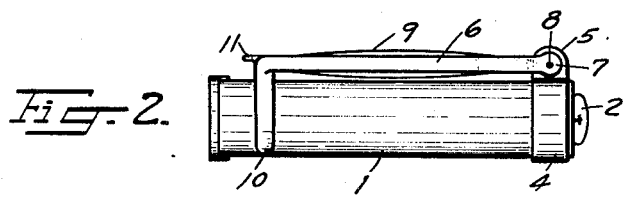
Fig. 2 is a side view of the same.

It is very frequently the case that when it is desired to look up names in letter boxes, telephone or city directories, that illumination is far from satisfactory or sufficient for clearly distinguishing names and addresses or numbers, and often it is necessary to have recourse to temporary light of the portable variety. This, however, only in a measure helps in such situations, for often the details most desired are very small and not well printed. For this reason, it is herein proposed to attach a special magnifying means to the portable light structure which may co-operate therewith to produce an enlarged and illuminated field upon any desired small area for close inspection and apprehension.

In the practice of my invention, I preferably employ a flash light body or casing 1 having the usual small bulb 2 at the front end and upon one side a trigger or button 3 whereby when circuit of a contained battery (not shown) is closed through the light bulb 2, the latter will glow in well known manner. Upon the casing 1, adjacent the front end, a band 4 or any suitable metal or other tenacious material is mounted, the two ends thereof being turned up at an angle to form at 5, 5 a hinge support or pivot for a frame 6 which is pivoted to said parts 5, 5 by means of a pin 8, the pin passing through a pair of corresponding lugs 7, 7. These lugs serve also to hold the pivot or hinge ends 5, 5 of the band 4 together so that the band is held frictionally upon the casing by this manner of assembly. The frame 6 envelopes a magnifying glass 9, the frame and the glass normally lying back conformably within the outline of the casing 1, although the glass may be truly oval or round in outline if desired.

Figure 3:
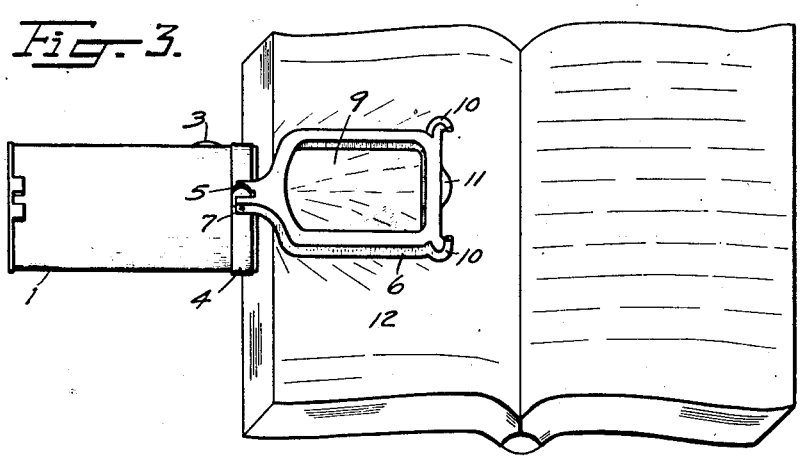
Fig. 3 is a view of the same in position over an open directory or the like, the magnifying attachment being opened in extended operative position over the page of said directory.

A means for holding the frame and magnifying glass in said idle retracted position upon the casing is provided in the form of a pair of slightly flexible grip fingers 10, 10, projecting from the sides of frame 6, and serve to grip the casing normally with a fair degree of friction and pressure, while a finger piece 11 is also provided whereby the frame may be lifted or forced up so as to release the fingers 10, 10 from the casing. The frame and glass may then be swung out over the end of the casing as indicated in Fig. 3, when the frame will tend to lie upon the band 4 and be stopped in its forward position for use. If the whole apparatus is then held over the page of a directory 12 as shown, and the button manipulated to light the bulb 2, the page will be illuminated and the words or details beneath the glass will be greatly magnified to a satisfactory and legible extent. When finished reading such matter, the light is turned off and the frame is swung back so that the fingers 10, 10 snap into position about the casing, and the whole is again compact and readily portable for future use.

The band 4 may, upon occasion be dispensed with, and the frame 6 hinged to the casing itself, such a modification readily suggesting itself to a careful observer, the main idea being to have the glass normally overlie the side of the casing in idle position, and on the other hand overlie the light bulb and front end of the casing in the opposite active position.

Having now fully described my invention, I claim:—

1. A portable magnifying and illuminating device comprising in combination, a casing, an electric light bulb mounted at one end of said casing, means for lighting said bulb at will, a pivot mounted on said casing at said end thereof, a frame of smaller dimensions than said casing hinged at one end to said pivot so that said frame will lie conformably within the outline of said casing in idle position and in extended active position will overlie said end of said casing and said bulb, a magnifying glass carried by said frame, and means for yieldingly holding said frame to said casing in the idle position.

2. A portable magnifying and illuminating device comprising in combination, a casing, an electric light bulb mounted at one end of said casing, means for lighting said bulb at will, a pivot mounted on said casing at said end thereof, a frame of smaller dimensions than said casing hinged at one end to said pivot so that said frame will lie comformably within the outline of said casing in idle position and in extended active position will overlie said end of said casing and said bulb, a magnifying glass carried by said frame, and means for frictionally holding said frame in said idle position including grip fingers secured to opposite sides of said frame and extending substantially at right angles thereto and spaced apart so as to releasably embrace said casing.

3. A portable magnifying and illuminating device comprising in combination, a casing, an electric light bulb mounted at one end of said casing, means for lighting said bulb at will, a pivot mounted on said casing at said end thereof, a frame of smaller dimensions than said casing hinged at one end to said pivot so that said frame will lie conformably within the outline of said casing in idle position and in extended active position will overlie said end of said casing and said bulb, a magnifying glass carried by said frame, means for frictionally holding said frame in said idle position including grip fingers secured to opposite sides of said frame and extending substantially at right angles thereto and spaced apart so as to releasably embrace said casing, and means for moving said frame about said pivot comprising a projection on said frame.

GEORGE T. SCHRODER.

CERTIFICATE OF CORRECTION.

Patent No. 1,886,747.  November 8, 1932.

GEORGE T. SCHRODER.

It is hereby certified that error appears in the printed specification of the above numbered patent requiring correction as follows: Page 2, line 71, claim 3, after "one" insert the word "end"; and that the said Letters Patent should be read with this correction therein that the same may conform to the record of the case in the Patent Office.

Signed and sealed this 20th day of December, A. D. 1932.

(Seal)

M. J. Moore,
Acting Commissioner of Patents.